L. GAUMONT.
METHOD AND APPARATUS FOR USING DISSIMILAR FILMS.
APPLICATION FILED JULY 24, 1920.
1,385,912.
Patented July 26, 1921.
2 SHEETS—SHEET 1.
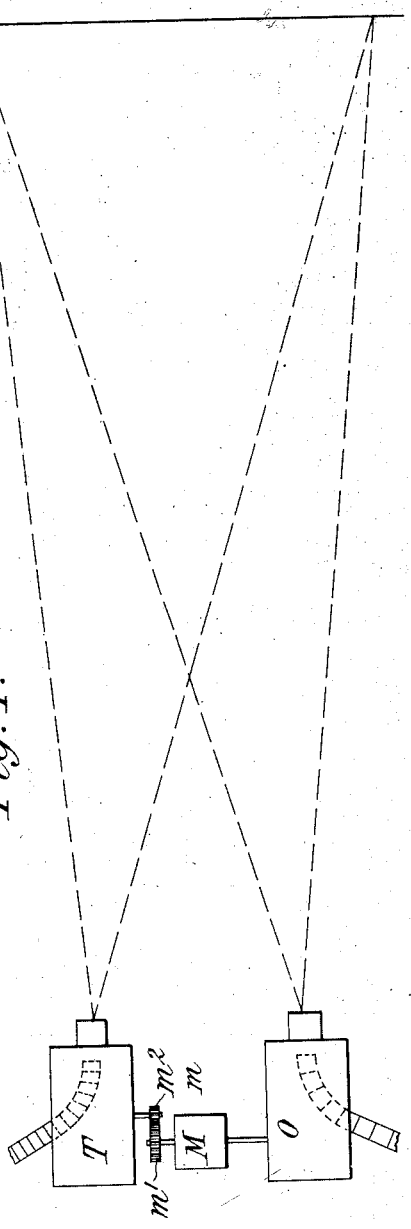
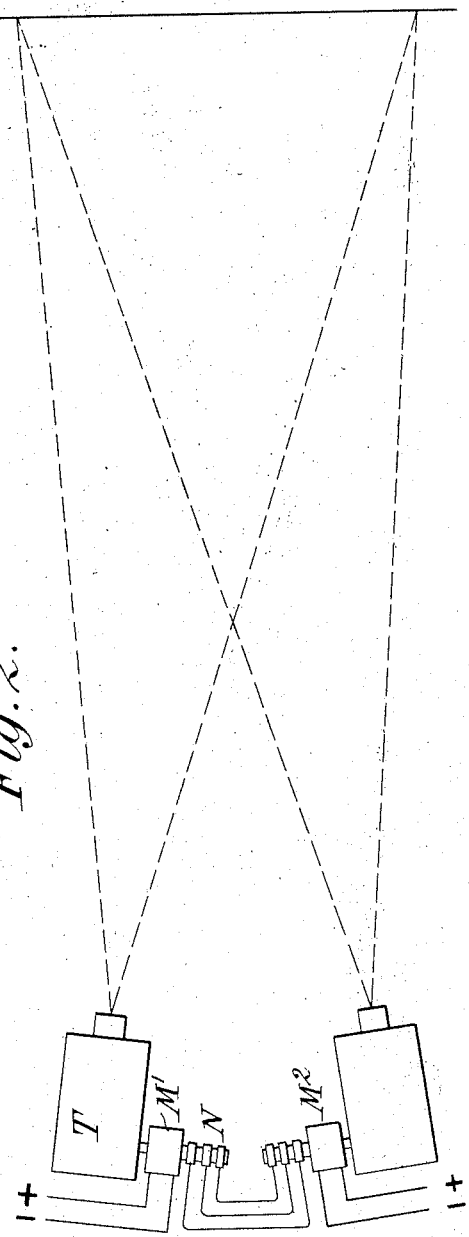
Inventor
Léon Gaumont
By his Attorneys,
Fraser Turk & Myers L. GAUMONT.
METHOD AND APPARATUS FOR USING DISSIMILAR FILMS.
APPLICATION FILED JULY 24, 1920.
1,385,912.
Patented July 26, 1921.
2 SHEETS—SHEET 2.
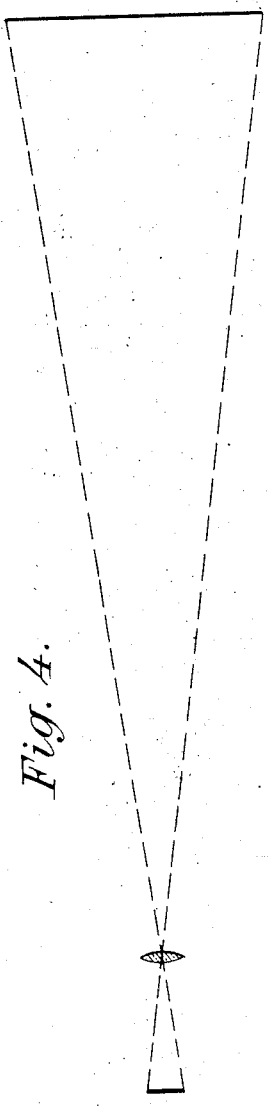
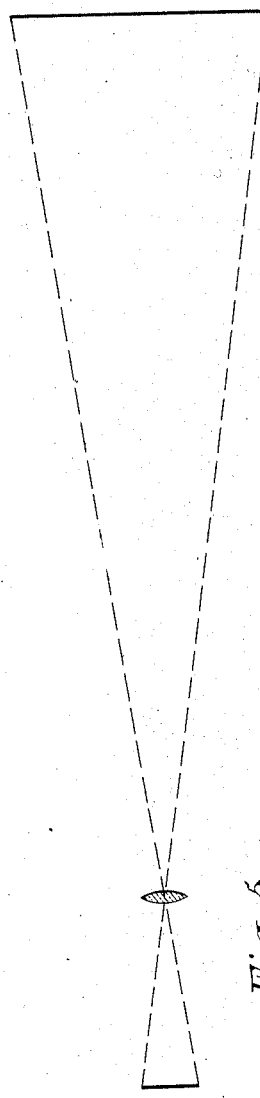
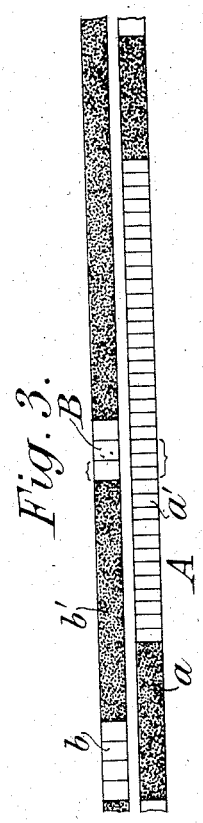
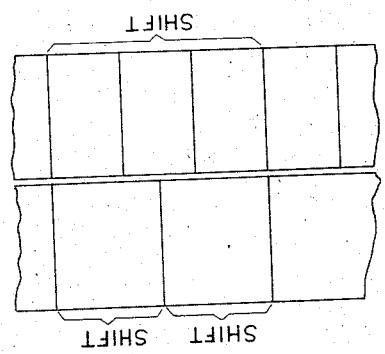
Inventor
Léon Gaumont
By his Attorneys,
Fraser Turk & Myers

UNITED STATES PATENT OFFICE.

LEÓN GAUMONT, OF PARIS, FRANCE.

METHOD AND APPARATUS FOR USING DISSIMILAR FILMS.

1,385,912.  Specification of Letters Patent. Patented July 26, 1921.

Application filed July 24, 1920. Serial No. 398,735.

*To all whom it may concern:*

Be it known that I, LEÓN GAUMONT, a citizen of the Republic of France, residing at No. 19 Rue Carducei, Paris, France, have invented certain new and useful Improvements in Methods and Apparatus for Using Dissimilar Films, of which the following is a specification.

This invention relates to cinematographic methods and apparatus, and aims to provide improvements therein.

The present invention provides a method and apparatus, whereby related dissimilar films may be used, especially for projection in continuous sequence.

The invention further provides a novel combination of parts and steps for accomplishing the projection of films in the manner set forth, hereinafter more fully disclosed and defined in the annexed claims.

As an example of dissimilar films for projection, might be mentioned the case of a film for ordinary, or so-called black and white projection, and a film for color projection, in which the size of the pictures or color records is different from the size of the pictures of the black and white film, or where the film shift in front of the projection lenses is different from that of the ordinary black and white film.

Under certain conditions, it is desirable to use dissimilar films, such as a film for projection in colors and a film for black and white projection, for alternate projection in continuous sequence upon the same screen. The projections through the color film and the projections through the ordinary films could be made to alternate in such manner that the ordinary film, for example, at appropriate times, could be used for the projecting of titles and reading matter, particular objects, close-up face views of persons, or the like, interspersed or interpolated in the color picture projections.

An embodiment of the apparatus of the present invention is illustrated in the accompanying drawings. Said drawings also serve to illustrate the method of the present invention.

In said drawings:—

Figure 1 is a diagrammatic view of one embodiment of the apparatus, viewed in a horizontal plane;

Fig. 2 is a similar view of another embodiment of the invention;

Fig. 3 is a detailed view of two dissimilar films to be used for projection;

Fig. 4 is a diagrammatic view, illustrating a relation between the projections from dissimilar films, where the size of the pictures or color records on the films are different;

Fig. 5 is a diagrammatic view, illustrating a relation between the sizes of the picture area or color record area on two dissimilar films.

Referring to said drawings, letter A designates a film, and B another film, dissimilar to the film A. The film A may be a film similar to that used in the projection apparatus described in my United States Patent No. 1,223,381, dated April 24, 1917. Such a film has three pictures or color records thereon, adapted for simultaneous projection to produce on the screen a single momentary colored picture, and these color records have the relation to the pictures of an ordinary black and white film that three color records (constituting a single picture) have the same length as two black and white pictures on a black and white film. Therefore, with a color film, the surface speed of the film past the projection opening is twice as great as that of an ordinary black and white film. The width of the picture record may be, and, in the film used in the apparatus of my aforesaid patent is, of the same width as an ordinary black and white film.

Each of the films A and B are placed in a projection apparatus T and O, for projection. The film A for color pictures is placed in the projection machine T, which may be similar in construction to the apparatus set forth in my aforesaid United States Patent No. 1,223,881, and the projecting device O may be an ordinary projection apparatus for black and white projection.

Means are provided for driving the two projection apparatus T and O at a definite relation to one another, and, in the case given above, with a color film having a color set of three records of a length corresponding to two black and white pictures, the machine for projecting the color pictures would be driven at twice the speed of the ordinary projection machine O. This speed relation may be accomplished in various ways. For example, a single motor M may be employed, and the machine O, for example, may be directly driven from the motor, while, between the motor M and the projecting machine T, gearing, or the like $m$, for increasing the speed of the motor shaft, may be provided. The motor shaft may be provided with a gear $m^1$, and the drive shaft of the machine T may be provided with a gear $m^2$, the gear $m^1$ being twice the circumference of the gear $m^2$, thereby driving the machine T at twice the speed of the machine O. Or, the design of the machine T may be such that the increased speed of the film-feeding or shifting mechanism is obtained in the machine itself, so that the gearing $m^1$ $m^2$ will not be necessary.

The projection may be started with the machine O for projecting the ordinary black and white pictures, for example, for projecting the title of the picture to be shown, the faces of the principals in the picture, or the like, and, during this time, projection from the machine T for the color pictures is preferably prevented from reaching the screen. There may be cases, however, where it would be desirable to have projections simultaneously upon the screen, either superposed or side by side, in which case the light from both of the projecting apparatus would be allowed to reach the screen.

Where the light from one projecting apparatus is to be cut off or stopped from the screen, during the projection from the other apparatus, any suitable means for this purpose may be provided. This result is most conveniently accomplished by relating the two films A and B to one another, in such manner that the film A, for example, has a black or opaque portion $a$, corresponding to the length of a transparent portion $b$ of the film B. Opposite the transparent portions $a'$ of the film A, the film B may be provided with an opaque portion $b'$, and so on. As the film A has twice the speed of the film B past the projection window, the length of the opaque portion $a$ is twice the length of the transparent portion $b$ of the film B. And the opaque portion $b'$ on the film B will be one-half the length of the transparent portion $a'$ of the film A. The result is that, when the transparent portion on one film ends, the opaque portion thereon begins simultaneously with the beginning of the transparent portion on the other film. The opacity may be produced by the use of a varnish or coating, but is preferably produced by incorporating into the mass of the film, ingredients which will render the film opaque.

Various other ways and means of cutting off the light from one projecting apparatus, while projections are going on from the other projecting apparatus, and effecting the reverse, could be used, but the present method appears to offer the best and simplest solution of the problem.

Means are also preferably provided as shown in Fig. 4, whereby the projections on the screen have substantially the same or a corresponding area or size, notwithstanding the difference in the area or size of the pictures or color records upon the film. This may be effected by several ways and means. For example, the objective lens in the ordinary projecting machine O may be made or adjusted so as to have or give less dispersion than the lens or lenses of the color picture machine; in other words, the magnification of the images on the ordinary film and the film for color pictures may be so averaged as to produce, as near as may be, a uniformity of size of pictured objects, and also of the picture height.

It will be understood that, for a picture story or long projection, a second group of projecting machines may be installed, in order to continue the projection on the second group of machines, after the films in the first group of machines have reached their end, as is usual.

Another embodiment of the projecting apparatus is shown in Fig. 2. In said figure, the machines T and O may be similar to those in Fig. 1. The machine T may be driven by a motor $M^1$, and the machine O may be driven by a motor $M^2$. Any suitable means, such as the means N, may be provided for securing the synchronous running of the motors. Such means are shown in United States Patent No. 545,111, granted August 27, 1895, to Elihu Thomas and Edwin W. Rice, Jr., whereby a movement of the motor $M^2$, synchronous with the motor $M^1$, may be obtained, and the speed of the projecting apparatus may be varied, by means of gears, or the like, as heretofore explained in regard to the relative speed of the projecting apparatus in Fig. 1.

The inventive ideas herein set forth may be embodied in apparatus other than that herein specifically illustrated and described, and the method is capable of being practised in different particular ways.

What is claimed is:

1. A method using related dissimilar films for projection, comprising feeding said films, through appropriate projection machines, controlling the feed of said films so that they have a definite speed relation, and providing each film with opaque portions for a length corresponding to the transparent portion of the other film, whereby the sequence of projections from the films is continuous.

2. An apparatus for using related dissimilar films for projection, comprising two projection apparatus, each appropriate to the film to be fed therein, and means for driving said apparatus at a definite speed relation, and means for cutting off the projection from one film during the projection from the other, said means comprising opaque film-portions, each of said opaque portions having a length corresponding to the length of the transparent portion which is to be projected during a corresponding time interval, whereby the sequence of projections from the films is continuous.

3. Two related films having alternate opaque and transparent portions, the opaque portions on one film corresponding in length to the length during the projection period of the transparent portion on the other film.

In witness whereof, I have hereunto signed my name.

LEÓN GAUMONT.